Aug. 10, 1965

A. F. ANDERSON 3,199,286

HYDROSTATIC DRIVE

Filed May 16, 1962

INVENTOR.
Arthur F. Anderson
BY
Harness, Dickey & Pierce.
ATTORNEYS.

FIG. 3.

INVENTOR.
Arthur F. Anderson
BY
Harness, Dickey & Pierce
ATTORNEYS.

3,199,286
HYDROSTATIC DRIVE
Arthur F. Anderson, Livonia, Mich., assignor to Gar Wood Industries, Inc., Wayne, Mich., a corporation of Michigan
Filed May 16, 1962, Ser. No. 195,177
28 Claims. (Cl. 60—19)

The present invention relates generally to fluid drive systems and more particularly to a novel hydrostatic drive system and controls therefor. The present system has application in any environment where a plurality of fluid motors may be used for a joint function, and for exemplary purposes is embodied herein in a hydrostatic drive system for a land vehicle.

Generally speaking, hydrostatic drive systems usually comprise a prime mover, a fluid pump driven thereby, and a plurality of motors powered by the fluid from the pump. When such a system is applied to a vehicle the prime mover is usually an ordinary internal combustion engine and an individual fluid motor is provided for each wheel, or for at least two wheels. There are, of course, other applications of hydrostatic drive systems, such as those for powering the rolls in a rolling mill, the propellers of the boat, the various feeds of a machine tool, and so on. However, for purposes of description the present invention will be described herein as applied to the powering of a land vehicle.

It is a primary object of the present invention to provide a hydrostatic drive system which achieves extremely high operational efficiencies by utilizing a single variable displacement pump, a plurality of variable displacement motors powered thereby, and automatic compensating means in conjunction therewith for regulating the displacement thereof in direct response to the load thereon, whereby there exists between the pump and each motor an automatic hydraulic transmission which is infinitely variable to optimize the torque and speed of each motor under all load conditions. A related object concerns the provision of such a system wherein the entire fluid drive operates in a non-slip positive displacement manner to further maximize efficiency.

Another object of the present invention resides in the provision of a unique drive system for vehicles which eliminates the use of conventional transmissions, gear boxes, drive lines, differentials, and axles, and in which dead weight is kept to a minimum, whereby the vehicle designer has almost unlimited freedom in choice of a vehicle silhouette, location of center of gravity and payload, ground clearance, and placement of power source and drive components. A related object concerns the provision of such a system in which the motors and compensators therefor may be assembled in a single or joined housing, as a cartridge which may be conveniently mounted within the hub of a wheel to be powered, each of the cartridges being fully mechanically independent of one another except for a pair of hydraulic lines, thus maximizing serviceability and interchangeability of parts and cartridges between vehicles or between different wheels of the same vehicle.

A further object of this invention resides in the provision of unique control means for a hydrostatic drive system which provide the utmost in flexibility of operation, which are simple to operate, presenting a minimum number of control levers to the operator, and yet which provides completely stepless acceleration and deceleration through the complete range of speed and torque of the powered wheels.

Another object resides in the provision of a unique dual functioning control system which utilizes a single accelerator control lever which in one mode of operation controls only engine speed, with the variable displacement pump automatically assuming a displacement position compatible with the torque output of the engine and proportional to the pressure and volume requirements of the entire drive system, thus giving maximum efficiency where operation is primarily at higher speeds; and in a second mode of operation controls only the displacement of the pump, with engine speed fixed, this mode of operation being ideal when the vehicle is being operated primarily at creeping speeds under heavy loads and/or where high engine speed is necessary for accessory drives. A related object concerns the provision of such a dual functioning control system which is also adapted to combine both of these modes of operation in any proportion desired, ideal when the vehicle is to be used under widely varying conditions.

Yet a further object of this invention resides in the provision of a unique hydrostatic drive system which does not require independent braking but which is so designed that two types of fluid braking are built into the system, one being in the form of self-braking which occurs when the accelerator lever is moved in a decelerating direction and the other residing in the provision of a separate brake control lever which converts the hydrostatic drive system into a fluid braking system utilizing exclusively the drive components thereof, thus eliminating all the conventional hardware necessary for mechanical, air or hydraulic brakes utilizing mechanical brake bands, brake drums and the like.

These and other objects of the present invention will become apparent from consideration of the specification taken in conjunction with the accompanying drawings in which there is illustrated an embodiment of the present invention, and wherein.

Figure 1:
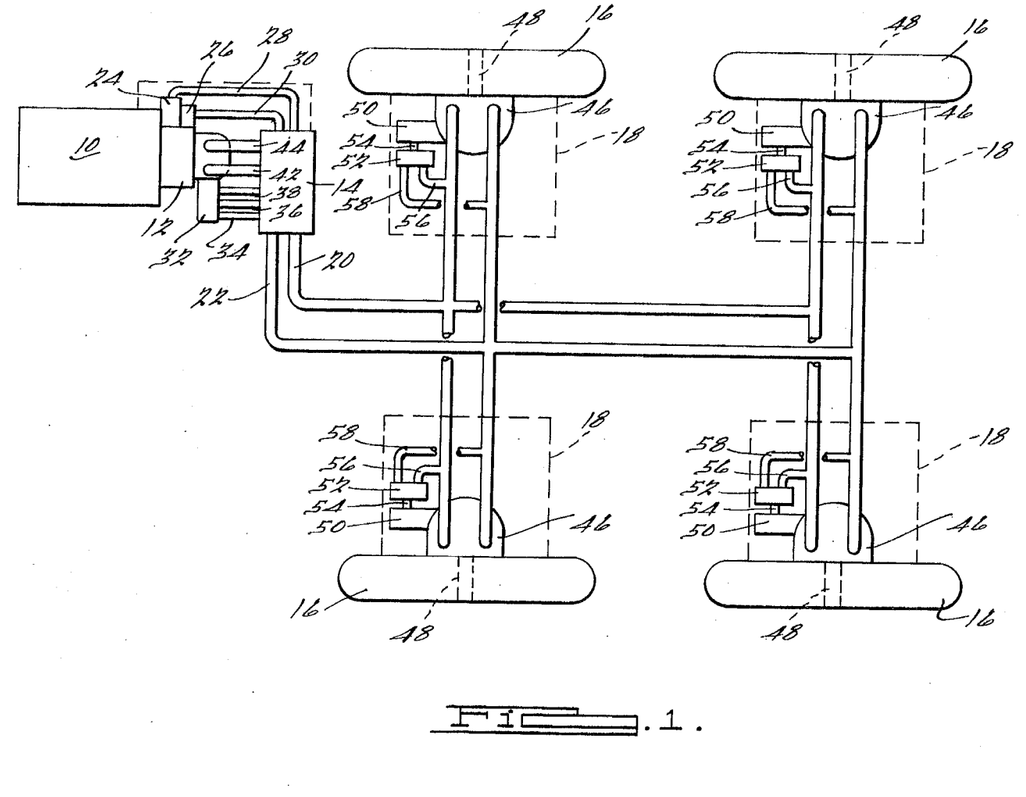
FIGURE 1 illustrates diagrammatically a wheeled land vehicle utilizing a hydrostatic drive system incorporating the principles of the present invention.

As can be seen in FIGURE 1, the hydrostatic drive system comprises an engine 10, which may be of the usual internal combustion type, a variable displacement fluid pump 12 driven directly thereby, a main control assembly 14 for controlling the overall operation of the system, a plurality of powered wheels 16, an independent motor-and-control assembly 18 associated with each powered wheel, and fluid lines 20 and 22 conecting the main control assembly with each of the motor-and-control assemblies in a parallel circuit. As can be seen, the only connection between each motor-and-control assembly is a pair of fluid lines, namely a supply line and a return line. A given line will act as a supply line for driven the wheels in one direction and as a return line for driving the wheels in the opposite direction so that a minimum number of hydraulic lines need extend through the vehicle to each of the motor-and-control assemblies.

Also driven by engine 10 in the conventional manner is a control pump 24 and a supercharge pump 26, communicating through fluid lines 28 and 30 respectively, with control assembly 14. For controlling the displacement of variable displacement pump 12 there is provided a pump compensator 32 which is in communication with control assembly 14 by means of fluid conduits 34, 36, and 38. The main supply and return lines from variable displacement pump 12 are indicated at 40 and 42, and communicate with control assembly 14, the details of construction of which will be described in detail hereinbelow. One pump which has been found to be ideally suited for the present application is the variable displacement pump disclosed in my copending application, Serial No. 71,033, filed November 22, 1960. The control and supercharge pumps, which are of considerably less capacity, may be of any suitable type.

Each of the motor-and-control assemblies 18, which if desired may be manufactured as interchangeable cartridge units, comprises a variable displacement fluid motor 46 having an outwardly projecting drive shaft 48 drivingly engaging a wheel 16, a motor compensator 50 for controlling the displacement and hence output of the associated motor, and a system pressure shuttle valve 52 for providing system supply pressure to the associated motor compensator through a fluid line 54. In each of the motor and control assemblies fluid is communicated from main fluid line 20 to shuttle valve 52 through a fluid conduit 56 and from main fluid line 22 through a fluid line 58. As will be appreciated, the vehicle may be provided with any number of ground-engaging wheels, and any number of the wheels provided may be motorized, depending upon the particular vehicle and application contemplated. Furthermore, if desired, similar motor control assemblies may be provided for controlling and operating accessories or other motivating means, such as a propeller in an amphibious vehicle.

Figure 2:
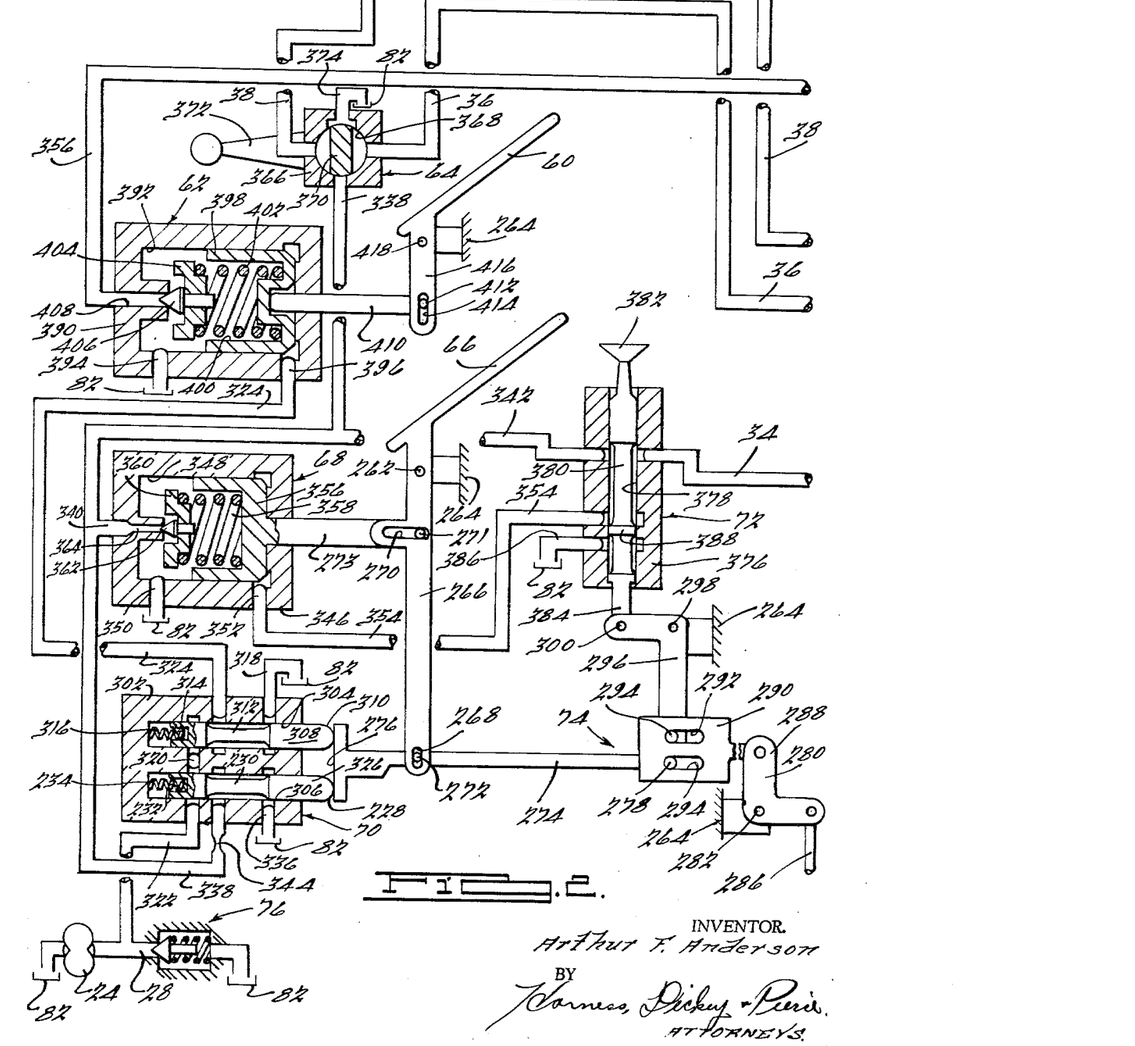
FIGURE 2 is the left-hand portion of a circuit diagram illustrating schematically a hydraulic circuit embodying the present invention.
Figure 3:
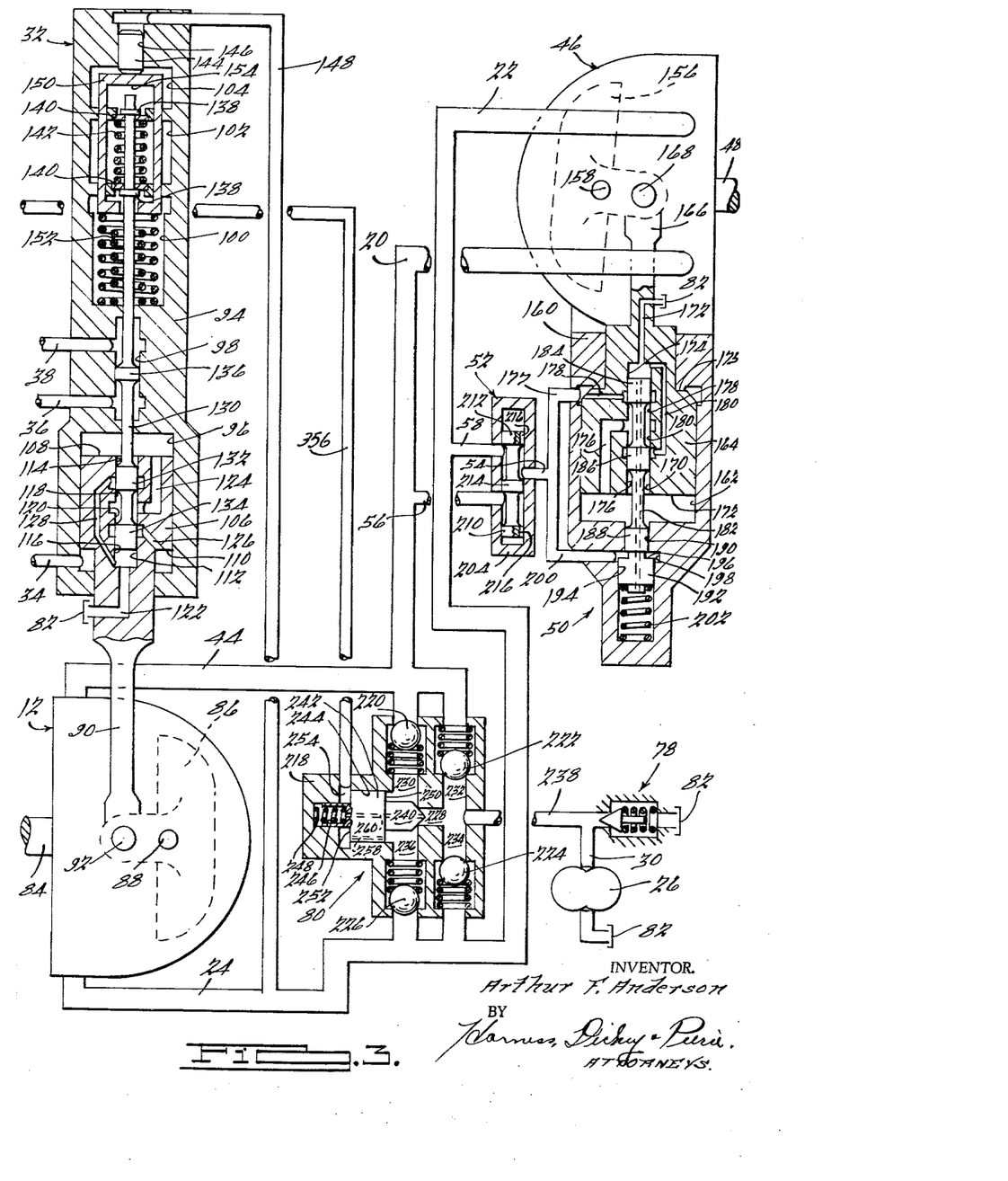
FIGURE 3 is the right-hand portion of the circuit diagram partially shown in FIGURE 2.

Generally speaking, referring to FIGURES 2 and 3, the control assembly indicated at 14 comprises a foot-operated brake lever or pedal 60, a brake valve 62 operated thereby, a manually operable directional valve 64, a foot-operated throttle or accelerator pedal or lever 66, a throttle pump valve 68 partially operated thereby, a throttle control valve 70 also operated thereby, a manually operable hand throttle valve or selector valve 72, a mechanical linkage 74 interconnecting throttle pedal 66, hand throttle valve 72 and throttle control valve 70, a control pump relief valve 76, a supercharge relief valve 78, a pilot-controlled main system pressure relief valve 80, and a fluid reservoir or tank indicated throughout the drawings at 82. Before considering the manner in which the present system operates, the details of construction of the various components will be described in greater detail to facilitate an understanding of the operation of the system.

Considering first the pump, there is illustrated a variable displacement piston-type pump having a drive shaft 84 driven by the engine and a tilt box 86 for varying the magnitude and direction of displacement of the pump from a zero displacement position, as illustrated in dotted lines in FIGURE 3, to a maximum displacement position in either direction. Tilt box 86 pivots around a stationary pivot 88 and the angular position thereof is controlled by an actuating arm 90 pivotally secured thereto by means of a suitable pivotal connection 92. As shown in FIGURE 3, the pump is so arranged that when actuating arm 90 moves upwardly fluid is pumped into supply line 44 for driving the vehicle in a forward direction, with line 24 serving as a return line, and when actuating arm 90 is moved downwardly fluid is pumped into supply line 24 for driving the vehicle in the reverse direction, with line 44 acting as a return line.

The position of actuating arm 90 and hence the operation of pump 12 is controlled hydraulically by pump compensator 32, comprising a housing 94 having a cylindrical servo chamber 96 at one end, a cylindrical pilot chamber 98, an overload spring chamber 100, a centering spring chamber 102, and at the opposite end an overload control chamber 104. Slidably disposed within servo chamber 90 is a servo piston 106 which in the present embodiment forms an integral part of actuating arm 90. Servo piston 106 is provided at its inside end with a pressure-receiving surface 108 and at its opposite end with a second pressure-receiving surface 110, which for proper servo control is illustrated as being approximately one-half the effective area of surface 108. Centrally disposed within servo piston 106 is an axially extending valve chamber 112 which is provided with sealing lands 114 and 116, and control lands 118 and 120. The upper end of valve chamber 112 is open and the lower end thereof communicates through a passageway 122 with tank 82. The portion of valve chamber 112 between lands 118 and 120 communicates through a passageway 124 with the upper end of the servo chamber partially defined by surface 108, and the portion between lands 120 and 116 communicates through a passageway 126 with the lower end of the servo chamber partially defined by surface 110. An internal passageway 128 is also provided within the servo piston for communicating fluid from between lands 114 and 118 and passageway 122 to tank. Fluid line 34, which communicates between compensator and the control assembly to supply control fluid to the former, as will be more apparent hereinafter, communicates with the lower end of servo chamber 96 partially defined by surface 110.

Slidably disposed within housing 94 is an elongated spool 130 having lands 132 and 134 at each end thereof disposed within valve chamber 112. Therefore, as can be seen, when fluid under control pressure is supplied through line 34, the exact positioning of servo piston 106, and hence the displacement of pump 12, will be determined solely by the axial position of spool 130. Thus, when fluid under control pressure is supplied through line 34 the force exerted thereby against surface 110 will tend to move the servo piston upwardly. However, assuming the spool remains in a fixed position, this control fluid will pass through passageway 126 around land 134, which no longer blocks it, through passageway 124 whereupon its pressure is exerted against surface 108 to move the servo piston in the opposite direction until it returns to a position where the relationship between the piston and the spool is the same as that illustrated in FIGURE 3. This servo action is facilitated by the difference in effective areas of each end of the piston. Accordingly, if the spool is moved downwardly, control fluid will pass through passageways 126 and 124 to push the piston downwardly until land 134 just blocks passageway 126, the only flow then being the slight amount of leakage necessary to maintain equilibrium. Conversely, when spool 130 is raised, the upper end of the servo chamber is communicated through passageways 124, 128 and 122 with tank so that the presence of fluid under control pressure acting against surface 110 moves the piston upwardly to the illustrated relative position with respect to the spool. Since the end surfaces of servo piston 106 are relatively large, its position will be controlled and maintained by relatively large forces, to maintain tilt box 86 in the desired position.

In order to control the position of spool 130, it is provided with land 136 slidably disposed within pilot chamber 98, the latter communicating at one end with passageway 36 and at the other end with passageway 38, which passageways are adapted to supply fluid under control pressure from the control assembly. As will be described in greater detail hereinafter, when it is desired to move tilt box 86 to a position which will drive the vehicle in a forward direction, fluid under control pressure will be supplied through line 36 to bias spool 130 in an upward direction, and when it is desired to drive the vehicle in the reverse direction, fluid under control pressure will be supplied in line 38 to bias the spool in a downward direction. The extent of the movement will be governed by the pressure of fluid supplied, as will be seen.

To maintain spool 130 in a centered position in which tilt box 86 is in a zero displacement position, to establish a centered reference point for the actuation thereof, the upper end of spool 130 is provided with a pair of fixed collars 138 for containing a pair of sliding washers 140 between which is disposed a slightly precompressed compression centering spring 142. As can be seen, washers 140 engage the ends of centering spring chamber 102 in such a way that spool 130 can be biased upwardly or downwardly within housing 94 but always subject to a centering force by virtue of spring 142.

To prevent the creation of an excessive pressure in line 24 greater than a predetermined amount, there is provided a pressure overload device for reducing the displacement of the pump, to substantially zero if necessary, when such an overload condition occurs, to thereby bring the pressure down to or below the predetermined amount. This device comprises an overload piston 144 slidably disposed within a bore 146 at the extreme end of housing 96. One end of piston 144 is responsive to the pressure of fluid in line 24 by means of a fluid line 148, and the opposite end of piston 144 engages a cage 150 slidably disposed within housing 96 normally independent of spool 130 and adapted to engage at its opposite end a plurality of load springs 152. Thus, if when the spool is in a raised forward pumping direction excess pressure is generated in line 24, it will bias piston 144 and hence cage 150 downwardly against the action of load springs 152, whereupon the inside surface of the upper end of the cage, indicated at 154, will engage the free end of spool 130 to bias it downwardly to reduce the displacement of the pump until the output pressure thereof falls to the predetermined value, as determined by the characteristics of spring 152. If it is desired to provide such overload protection when the pump is pumping in the opposite direction, a similar device may be incorporated within the pump compensator to raise spool 130 in response to a predetermined high pressure in line 44.

Ignoring for the present all the control components necessary to control the operation of pump 12 by means of compensator 32, each of the fluid motors is provided with a motor compensator 50 for controlling the output of the associated motor solely in response to system pressure, which is in turn established by the speed and displacement position of the pump and the load on the system. Each of the motors 46 is illustrated as being of the variable displacement piston-type, having a tilt box 156 mounted in the usual manner about a pivot 158 for varying the displacement and hence torque and speed output of the motor. In the disclosed embodiment, each of the motors has its tilt box mounted for pivotal movement from a minimum positive displacement position to a maximum positive displacement position in one direction. The way the system is arranged, it is unnecessary that the motors be capable of reversing their direction of displacement by means of the tilt box, and the minimum displacement position is slightly greater than zero so that there will be no difficulty in starting the motor by supplying fluid thereto. If desired, the motors may also be constructed according to the principles of my invention set forth in the aforesaid copending application.

Motor compensator 50, which is attached to the motor, comprises a housing 160 having a servo chamber 162 in which is slidably disposed a servo piston 164 which is provided at one end with an actuating arm 166 in turn pivotally secured to tilt box 156 at 168 to control the displacement thereof. Servo piston 164 is constructed in generally the same manner as servo piston 106 in the pump compensator, and comprises an axial valve chamber 170 communicating at one end through a passageway 172 with tank 82 and provided with sealing lands 174 and 176, and control lands 178 and 180. One end of servo piston 164 is provided with a relatively large pressure-receiving surface 172 and the opposite end is provided with a relatively small, i.e., approximately one-half area, pressure-receiving surface 175. Surface 175 serves to partially define the upper end of servo chamber 162 into which fluid under system pressure is communicated by means of a fluid line 177. When servo piston is in its fully extended position, as illustrated, surface 175 abuts a portion of housing 160 which serves as a positive stop to establish the minimum displacement position of the motor. Also provided are passageways 176, 178, and 180 corresponding exactly to passageways 124, 126, and 128, respectively, in the pump compensator.

Slidably disposed within valve chamber 170 is an elongated spool 182 having at one end lands 184 and 186 corresponding exactly to lands 134 and 132, respectively, on spool 130 in the pump compensator. At its opposite end spool 182 is provided with a sealing land 188 sealingly disposed within a bore 190 in housing 160 and with another sealing land 192 sealingly disposed within a spring chamber 194. As can be seen in FIGURE 3, lands 188 and 192 are of different diameters and the spool is grooved therebetween, as indicated at 196. Groove 196 in turn corresponds with a chamber 198 which is adapted to receive fluid under pressure through a fluid line 200. Because of the differences in diameters of lands 188 and 192, land 192 being the larger of the two, the presence of fluid under pressure within chamber 192 will bias the spool downwardly as shown, and to resist this movement there is provided a spring 202 within spring chamber 194.

As should now be apparent, servo piston 164 operates in exactly the same manner as servo piston 106 and its position and hence the displacement of the motor is established solely by the position of spool 182, the position of which is controlled by the action of fluid under pressure in chamber 198 acting against spring 202. The difference between the two compensators is that the motor compensator has an at-rest minimum displacement position and can be controlled to an increased displacement in one direction only. Also the pump compensator is operated by control fluid from the control pump, whereas the motor compensators are operated by system fluid at system pressure from the variable displacement pump.

The operation of compensator 50 is made responsive to system pressure by the provision of system pressure shuttle valve 52, one being provided for each motor. Since fluid lines 20 and 22 will alternately carry supply pressure, depending upon the direction in which the vehicle is powered, the shuttle valve is provided to insure that supply pressure is always communicated to fluid lines 177 and 200 to control the operation of the motor compensator. As can be seen, the shuttle valve comprises a housing 204 having a valve chamber 206 therein in which is slidably disposed a spool 208 having lands 210 and 212 at each end thereof and a central land 214. Lands 210 and 212 are each provided with a slot or flat side 216 to facilitate shifting of the spool. The shuttle valve operates in the conventional manner so that when supply fluid is in line 22, it is transmitted through line 58 to shift the spool to the left to the position illustrated, to allow fluid at supply pressure to communicate with lines 177 and 200. When the direction of pumping is reversed and line 20 becomes a supply line, the presence of fluid under supply pressure in line 56 causes the spool to move to the right so that it can communicate with lines 177 and 200, in which position line 58 is blocked.

As can thus be seen, each of the motors 46 operates solely in response to system pressure, whether it be in line 20 or line 22. If system pressure is low, each of the motors assumes a minimum displacement position, and as system pressure increases so does the displacement of each of the motors until a maximum displacement position is reached, mechanical stops being provided in the motors and/or their compensators to define this limit position.

Generally speaking, maximum system pressure is determined by main system pressure relief valve 80 which comprises a housing 218 having four conventional check valves 220, 222, 224, and 226 therein, check valves 220 and 222 communicating with fluid line 44, and check valve 224 and 226 being in fluid communication with fluid line 24. Centrally within housing 218 there is provided a passageway 228 communicating with check valve 220 and 222 by means of passageways 230 and 232, respectively, and communicating with check valves 224 and 226 by means of passageways 234 and 236, respectively. Also communicating with passageway 228 is a fluid line 238 extending from supercharge pump 226. The output pressure of fluid from the supercharge pump is established by supercharge relief valve 78, which is of conventional construction.

It will be noted that the four check valves are arranged in such a way that the only way fluid can flow from line 44 to line 24 is through check valves 220 and 224, and the only way fluid can flow in the opposite direction is through check valves 236 and 222. To control this flow, which in either case must pass through passageway 228, there is provided a relief valve element 240 which seats upon the end of passageway 228 to block communication therethrough when in the seated position. Valve element 240 is in turn actuated by means of a piston 242 slidably received within a bore 244 in housing 218. Piston 242 is provided at its upper end with a spring-receiving bore 246 in which is disposed a compression spring 248 which acts against the end of housing 218 to urge valve element 240 into a seated position. The lower surface of piston 242, indicated at 250, is subject to the pressure within passageways 230 and 236, and the upper face thereof, indicated at 252 is subject to the pressure within a chamber 254 in the housing. The pressure within chamber 254 is regulated by the brake valve 62, in a manner to be described hereinafter, by communication through a fluid line 256 with chamber 254. A bleed orifice 258 is provided within piston 242 extending from surface 250 to surface 252, and another bleed orifice 260 extends axially the length of the piston and valve element from passageway 228 to spring-receiving bore 246.

The operation of relief valve 80 is generally as follows. When the valve is in its normal position, as illustrated, and fluid line 256 is blocked by brake valve 62, valve element 240 blocks passageway 228 so that no fluid may flow between lines 44 and 24. The presence of supply fluid within passageways 230 and 236 will not unseat valve element 240 since this fluid will bleed through passageway 258 to balance the pressure on the opposite surface of piston 242, thus allowing spring 248 to maintain the valve element in its seated position. The valve element is further maintained in a seated position by virtue of the fact that fluid cannot escape through passageway 256 so long as the brake valve is closed. The presence of fluid under supercharge pressure within passage 228 does not tend to unseat the valve element since this pressure is communicated through bleed orifice 260 into spring-receiving bore 246. However, in the event that the system requires the addition of fluid thereto on account of leakage or the like, fluid under supercharge pressure in passageways 232 and 234 will flow through the appropriate check valve 222 or 224 into whichever of fluid lines 44 and 24 is then acting as the return line. Flow will be possible because the return line will be at substantially zero pressure whereas the supercharge fluid will be at a positive pressure. Supercharging in this manner will occur regardless of the position of valve element 240.

In the event that and to the extent that brake valve 62 is activated in such a way as to unblock fluid line 256, piston 242 in conjunction with valve element 240 will operate to determine the maximum pressure differential which may exist between lines 44 and 24. As will be more apparent hereinafter, brake valve 62 is in fact a variable relief valve. When it is in a high pressure position it determines the maximum pressure which may exist in fluid line 256, which in turn establishes the pressure in passageways 230 and 236 above which piston 242 will be biased upwardly to unseat valve element 240 and allow fluid to dump from the supply line to the return line. When the brake valve is set at its minimum pressure position, wherein passageway 256 is substantially unblocked, the existence of any pressure within passageways 230 or 236 will cause a pressure drop across opposite surfaces of the piston by virtue of the flow through bleed orifice 258 so that the valve element will remain unseated and substantially the entire output of the pump will be dumped from the supply line to the return line. As will be discussed in greater detail hereinbelow, when the system is in any condition in which the vehicle is being driven, the brake valve is at its maximum pressure setting, thus establishing maximum system pressure, and has no bearing on the operation of the pump or motors at any pressure less than this maximum predetermined pressure.

Turning now to the components of the control assembly, in order to best understand the construction of these components, a brief description of their function will be given. Throttle lever 66, is, of course, used to control the speed and acceleration of the vehicle. As was indicated above, however, the control system is arranged for two different modes of operation, one in which engine speed is fixed, and another in which engine speed is variable. Vehicle acceleration and speed in both these modes is controlled by the throttle lever 66 and the particular mode of operation of the system at any one time is determined by the position of hand throttle valve 72. Throttle pump valve 68 is operated by throttle lever 66 and varies the pressure of fluid to pump compensator 32 to thereby control the displacement and output of the pump. Throttle control valve 72 is also actuated by throttle lever 66 and serves to disable brake valve 62 when the vehicle is being driven under power and to disable throttle pump valve 68 when the system is set for a variable engine speed mode of operation. Mechanical linkage 74 is also actuated by throttle lever 66 and serves to vary engine speed. Directional valve 64 is simply a two-position diverter valve for controlling the direction of flow through the pump and hence the direction in which the vehicle will be driven. Brake valve 62, as the name implies, is actuated by brake lever 60 to brake the vehicle.

As can be seen in FIGURE 2, throttle lever 66 is pivoted about a point 262 which in turn is attached to a suitable portion of the vehicle frame, indicated at 264. Throttle lever 66 may be of any suitable configuration; however, it is illustrated for exemplary purposes with a downwardly depending linkage member 266 having at its lower end a vertical slot 268 and intermediate its ends a horizontal slot 270 adapted to receive a pin 271 secured to the free end of an actuating plunger 273 forming part of throttle pump valve 68. Slot 268 is adapted to receive a pin 272 pivotally secured to a horizontally disposed linkage member 274 which is provided at one end with a cam surface 276 and its other end with a transversely extending projection or pin 278.

In order that the reciprocal movement of member 274 may be used to control engine speed, there is provided a crank member 280 freely pivotal about a pivot 282 attached to another suitable portion of frame 264. Crank member 280 is provided with a first outwardly projecting arm 284 to which is pivotally secured in a conventional manner a governor control rod 286 which is directly connected to the usual engine governor (not shown) for controlling the speed of the engine. Crank member 280 is also provided with a second arm 288 to which is pivotally secured a linkage member 290 having upper and lower parallel disposed slots 292, 294 respectively. Slot 294 is adapted to receive pin 278 and slot 292 is adapted to receive a pin 294 disposed at the free end of one arm of a crank member 296 which is pivotally secured to a suitable portion of frame 264 by means of a pivot 298. At the free end of the other arm of crank pin 296 there is provided a pin 300 for connecting the member to hand throttle valve 72.

Thus as can be seen, when throttle lever 66 is depressed, it will cause actuating plunger 273 to move to the left unless it has already been so actuated hydraulically in a manner which will become apparent. In addition, member 274 and hence cam surface 276 and pin 278 will also be moved to the left as described. The movement of cam surface 276 will actuate throttle control valve 70 and the movement of pin 278 will move member 290 to the left, if it has not already been so moved by the actuation of hand throttle valve 72 acting through crank member 296, to raise control rod 286 and thus increase engine speed.

Considering the control assembly components in greater detail, throttle control valve 70 comprises a housing 302 having valve bores 304 and 306 therein. Slidably disposed within bore 304 is a spool 308 having at the outer free end a cam surface 310 adapted to engage surface 276 at the end of member 274, intermediate its ends a reduced diameter portion 312, and at its opposite end a spring-receiving bore 314 in which is disposed a compression spring 316 which acts against the end of bore 304 to urge spool 308 against cam surface 276. One end of bore 304 communicates through a passageway and fluid line 318 with tank 82. Adjacent the opposite end of bore 304 there is provided a passageway 320 communicating in turn with the corresponding end of bore 306 and a passageway and fluid line 322 which is adapted to receive the output of control pump 24, the pressure of which output is governed in the usual manner by pressure relief valve 76 which is of conventional construction. Intermediate passageways 318 and 320 a fluid line 324 communicates with bore 304. Passageway 324 communicates at its opposite end with brake valve 62. Thus, when spool 308 is in its at-rest position, as illustrated, fluid line 324 communicates with tank 82, but when the accelerator lever is depressed and spool 308 is moved to the left, passageway 324 is taken out of communication with tank and placed in communication with passageway 320 in which there is fluid at control pressure. Therefore, when throttle lever 66 is depressed, fluid under control pressure is communicated through line 324 to brake valve 62.

Slidably disposed within bore 306 is a second spool 326, which is similar in construction to spool 308, and comprises at the outer end thereof a cam surface 328, intermediate the ends thereof a reduced diameter portion 230 and at the opposite end thereof a spring-receiving bore 232 in which is disposed a compression spring 234 for urging spool 326 against cam surface 276. One end of bore 306 communicates through passageway and fluid line 336 with tank 82 and the opposite end thereof communicates by means of aforementioned line 322 with control pump 24. Intermediate passageways 336 and 322 is a passageway 338 which communicates by means of a branch line 340 with throttle pump valve 68, by means of another branch line 342 with hand throttle valve 72, and ultimately with directional valve 64. As can be seen, when spool 326 is in the at-rest position, as illustrated, passageway 338 communicates with tank 82, but when throttle lever 66 is depressed and spool 326 is urged to the left, passageway 338 is taken out of communication with tank and put into communication with fluid under control pressure in passageway 322. Therefore, when the throttle lever is depressed, fluid substantially under control pressure is supplied to the throttle pump valve, the hand throttle valve, and the directional valve. In order to prevent too great a pressure drop in line 324 when fluid under control pressure is introduced simultaneously into line 338, the latter is provided with a restriction 344 for maintaining upstream pressure.

Throttle pump valve 68 comprises a housing 346 having a cylinder bore 348 therein, one end of which communicates through a passageway 350 with tank 82 and the other end of which communicates through a passageway 352 and a fluid line 354 with hand throttle valve 72. Slidably disposed within bore 348 is a piston 356 to one end of which is secured actuating plunger 273. The opposite end of piston 356 is recessed to receive a compression spring 358 which is compressed between the piston and a retainer member 360. A valve element 362 is disposed within a central aperture in member 360 and is provided with a conical valve surface adapted to seat within the open end of a passageway 364 in housing 346, which passageway communicates with fluid line 340. As can thus be seen, the throttle pump valve is in effect a variable relief valve for controlling the pressure in fluid line 338 from a minimum value when piston 256 is fully retracted and fluid can dump to tank through passageway 350, as illustrated, to a maximum value when piston 356 is urged to the left either by the application of mechanical force to actuating plunger 273 or by the supply of fluid at an increased pressure through passageway 352.

Directional valve 64 comprises a housing 366 having a cylinder bore 368 in which is positioned a rotary valve element 370, the angular position of the latter being manually controlled by means of a handle 372. Communicating with bore 368 is fluid line 338, the pressure of the fluid in which is controlled by throttle pump valve 68, and fluid lines 36 and 38 which communicate with the pilot section of the pump compensator. Also communicating with bore 368, by means of passageway 374 is tank 82. When the directional valve is in its neutral position, as illustrated, lines 36 and 38 communicate through line 374 with tank and line 338 is blocked. However, when valve element 370 is rotated clockwise, fluid in line 338 is communicated to line 336 to enable the pump to drive the vehicle in a forward direction, and when the valve element is rotated counterclockwise, the fluid in line 338 is communicated to line 38 to enable the pump to drive the vehicle in a reverse direction.

Hand throttle valve 72 comprises a housing 376 having a bore 378 therein in which is slidably disposed a spool 380, the latter having at its upper end a manually operable handle 382 and at its lower end a projection 384 to which is secured pin 300 for varying engine governor speed. Communicating with bore 378 are fluid lines 342, 354, and a fluid line 386 which communicates with tank 82. Also communicating with bore 378 is fluid line 34 for communicating fluid under control pressure from fluid line 342 to the pump compensator. Intermediate its ends, spool 380 is provided with a valve land 388 which in the position illustrated is disposed between passageways 354 and 386. As noted above, this valve establishes whether or not the system is to operate initially at substantially fixed engine speed, with variable pump displacement, or whether it is going to operate at variable engine speed, with relatively fixed pump displacement, or whether it is going to operate somewhere between these two positions. The valve is illustrated in the second of these positions, namely, in a position where the throttle lever controls only engine speed and the pump is maintained at maximum displacement, at least insofar as the control circuit is concerned. This occurs because fluid under control pressure in line 342 is communicated through the valve to line 354 and thus through passageway 352 in the throttle pump valve to urge piston 356 to its leftmost position, in which position fluid under maximum control pressure is supplied through line 338 to the directional valve and motor pump compensator and in which position actuating plunger 273 and hence piston 356 is no longer under control of the throttle lever.

When spool 380 is raised, passageway 354 is brought into communication with passageway 386 and tank so that piston 356 in throttle pump valve 68 is placed under the control of throttle lever 66. At the same time as spool 380 is raised it operates through members 296, 290, and 280 to raise control rod 286 and thus increase minimum engine speed. As will be appreciated, the exact position of spool 380 can be set anywhere between a position in which line 354 is in full communication with the tank at a position in which it is in full communication with fluid under control pressure from line 342, with a corresponding decrease in minimum engine speed.

Brake valve 62 operates as a variable relief valve generally and is similar to throttle pump valve 68, comprising a housing 390 having a cylinder bore 392 therein, one end of which communicates through a passage 394 with tank 82, and the other end of which communicates through a passageway 396 with fluid line 324. Slidably disposed within bore 392 is a piston 398 having a recess 400 therein in which is positioned a compression spring 402, the latter being adapted to act between the piston and a retainer member 404 having a central aperture in which is positioned a valve element 406 having a conical valve surface seating within an axially aligned passageway 408 in housing 390. As can thus be seen, the position of piston 398 governs the pressure which is allowed to build up in fluid line 356 which extends to the main system pressure relief valve 80. The position of piston 398 can be controlled either by the introduction of fluid under control pressure through passageway 396 or mechanically by means of an actuating plunger 410 which at one end abuts against the piston and at the opposite end is provided with a pin 412 positioned within a slot 414 of an arm 416 forming part of brake lever 60, the latter being pivoted about a pivot 418 secured to a suitable portion of frame 264. Thus, when the brake lever is depressed, piston 398 will be urged to the left to restrict dumping through passageway 394 to tank and thereby increase the pressure within fluid line 356; however, in the event the piston is so moved by fluid introduced through passageway 396, brake lever 60 will remain in its undepressed position since plunger 410 is not mechanically secured to the piston.

*Operation*

For purposes of description, it will first be assumed that the vehicle engine is operating and that it is desired to drive the vehicle forward from a stationary position, using a variable engine speed mode of operation, this mode being best suited and most efficient where higher speed applications predominate. The system is first set by moving handle 372 of the directional valve in a clockwise direction for forward movement and pushing handle 382 of the hand throttle valve to its lowermost position, as illustrated. Until the throttle lever is depressed, however, nothing will happen since the pump is in its at-rest zero displacement position and since spool 326 of the throttle control valve blocks the introduction of fluid under control pressure into the control system. When it is desired to start the vehicle into motion, the throttle lever, which is illustrated as being in the form of a conventional accelerator pedal, is depressed thus causing mechanical actuation of governor control rod 286 to start increasing engine speed and actuation of the throttle control valve. Actuation of the latter causes fluid under control pressure to be communicated through fluid lines 338, 342, and 354 to the throttle pump valve to cause piston 356 to move to its leftmost maximum pressure position, out of the control of the throttle lever. Actuation of the throttle control valve also causes fluid under control pressure to be communicated through fluid line 324 to the brake valve to bias piston 398 therein to its leftmost position in which the maximum amount of pressure will be allowed to build up in line 356.

As a result, fluid under control pressure is supplied through fluid lines 338 and 36 to the pilot section of pump compensator 32, whereupon it causes spool 130 to move upwardly to in turn cause the pump to be stroked to its maximum displacement position in which line 24 is the supply line and line 44 is the return line, all in the aforementioned manner. Since the brake valve is set to maintain a maximum pressure in fluid line 256, relief valve 80 thereby allows system pressure to increase to a maximum predetermined amount. The presence of fluid under system pressure in line 24 and hence line 58 causes spool 214 of the shuttle valve associated with each of the motors to move to the position illustrated to cause each of the motors in the system, to have their displacement increased from the minimum displacement position illustrated to a maximum displacement position. The presence of fluid under system pressure in line 22 will therefore cause the motors to operate to turn the wheels of the vehicle and drive it forwardly. Since the motors are in their maximum displacement positions, a maximum amount of torque will be exerted by each of the motors to accelerate the vehicle.

Assuming the throttle lever is maintained in the depressed position, the vehicle will continue to accelerate to a point where the full output flow of the pump is consumed by all the motors, at which time system pressure will start decreasing. When this occurs, each of the motor servos will operate in response to this decrease in system pressure to decrease the displacement of the associated motor. This will in turn increase the mechanical advantage of each of the motors and cause the vehicle to continue to accelerate but at a gradually decreasing torque. This change will take place gradually until all of the motors have been stroked back to a minimum operating displacement position in which the torque generated by each of the motors is at a minimum but the speed is maximum.

In the event the load upon the vehicle increases, such as would occur if it encountered a hill, such load would be reflected by an increase in system pressure. This would in turn be sensed by the motor compensators which in response thereto would increase the displacement of the associated motor to increase the torque output thereof to overcome the load. As the load again diminishes, the motors will return to a lower displacement position to bring the vehicle back up to speed. If an excessive load is encountered, not only will the motors act in this manner but overload piston 144 in the pump compensator will in response to such load decrease the displacement of the pump to prevent excessive rise of pressure in the system. This overload feature also conserves engine power since system pressure will not be maintained solely by the wasteful dumping of system fluid across the relief valve, with the attendant inherent power loss and increased temperature problems; but is instead regulated to a large extent by varying the displacement of the pump to avoid unnecessary dumping by decreasing the output of the pump.

If the operator of the vehicle desires to decelerate the vehicle, all he has to do is back off partially on the accelerator pedal. This will directly reduce engine speed and hence the output of the pump, which in turn causes each of the motors to drive at a slower speed. In fact, since a substantially non-slip positive displacement drive is utilized, the wheels will actually be positively decelerated or braked until they are rotating at a speed compatible with the reduced output of the pump. In other words, acceleration and deceleration may be controlled by the accelerator pedal. However, in the event the operator's foot is completely lifted from the accelerator pedal, the deactuation of the throttle pump valve, throttle valve, brake valve and engine will cause the system pressure to drop to zero and pump displacement to move to a zero position, whereupon the motors will also return to their minimum displacement position and the vehicle will freewheel.

Braking of the vehicle may then be achieved by depressing brake lever 60 and will occur in the following manner. Considering maximum braking first, since this is the easiest to visualize, if the operator of the vehicle pushes brake lever 62 to its lowermost position, piston 398 and valve element 406 within the brake valve will be moved to their leftmost position to establish a maximum relief pressure within line 356 and hence chamber 254 of relief valve 80. Since the minimum displacement position of each of the motors is slightly positive, each of the motors will then be acting as pumps to pump system fluid across pump 12 and relief valve 80. However, since pump 12 is in a zero displacement position, it substantially blocks the flow of fluid therethrough, and since relief valve 80 is set for a maximum relief pressure, each of the motors will cause system pressure to increase to a maximum relief pressure, whereupon it will be dumped across relief valve 80 to the low pressure side of the system. In addition, as soon as system pressure starts to build up because of the pumping action of the motors, each of the motor compensators will cause its associated motor to be stroked to a full displacement position, and this will in turn increase the volume output of the motors per revolution and thus tend to further increase system pressure. The result is that with each of the motors in a maximum displacement and hence maximum torque position, and system pressure at maximum, very severe hydraulic braking will take place. In fact, as a practical matter, it has been found that full depression of brake lever 60 will cause any vehicle to lock all its driven wheels.

Partial or gradual braking is achieved by simply depressing brake lever 60 a lesser amount, in which case brake valve 62, which is in effect a variable relief valve, will be actuated to a lower relief pressure setting. This in turn will reduce the relief pressure setting of relief valve 80 below that in the previously assumed operating condition which will reduce maximum system pressure and in turn the maximum displacement position of the motors, with the overall result being that a lesser degree of hydraulic braking is achieved. As may thus be seen, when the accelerator pedal is up, the operation of the vehicle may be maintained anywhere between a freewheeling condition and a condition in which all the motors are fluid locked, simply by properly positioning brake lever 60.

In order to maintain a proper sequence between braking and powering, throttle control valve 70 is preferably constructed in such a way that when the throttle lever is depressed and cam surface 276 moves to the left against spools 308 and 326, spool 326 communicates fluid under control pressure to the brake valve just slightly prior in time to when spool 326 communicates fluid under control pressure to the directional valve. This is to insure that the hydraulic braking system is completely inactivated when the vehicle is ready to start moving under power. The operation will also be such that when the operator lifts his foot from the accelerator pedal, spool 326 will deactivate the control of the pump compensator before spool 308 energizes the braking system to make it responsive to brake lever 60.

In the event it is desired to drive the vehicle in a reverse direction, it is only necessary to rotate valve element 370 of the directional valve counterclockwise from the position illustrated in FIGURE 2. The entire above-described operation of the system, including braking, will be exactly the same except that the direction of flow through pump 12 and each of the motors will be reversed and the shuttle valves 52 associated with each of the motors will be shifted so that each of the motor compensators is responsive only to system, rather than return, pressure.

If it is contemplated that the vehicle will be used primarily at slow or creeping speeds under heavy loads in a given application, regardless of the direction of drive, it has been found that ideal control characteristics may be achieved by operating in a fixed or partially fixed minimum engine speed condition. This may be achieved by lifting the manually operable handle 382 of hand throttle valve 72 to its uppermost position for fully fixed engine speed operation. The throttle linkages are so arranged that in this position the hand valve, control rod 286 actuates the engine governor to maintain the engine at maximum operating speed. In addition, hand valve 72 is so constructed that in this position land 388 will be positioned somewhere between passageways 354 and 342. In this position, fluid line 354 will communicate with tank 82 so that the throttle pump valve will be under the sole control of the control lever.

Until throttle lever 66 is depressed, the system remains static. When the throttle lever is depressed, spools 308 and 326 of the throttle control valve are actuated in the aforedescribed manner. However, in this mode of operation the pressure of the fluid within the passageway 338 will be governed by the throttle pump valve by means of the actuation of piston 356 by the throttle lever. Accordingly, when the throttle lever is depressed only partially, just enough to fully actuate the throttle control valve, the throttle pump valve will be at a minimum pressure relief setting so that the pressure within fluid line 338 will be at a minimum. This pressure will, of course, be felt, through the directional valve, by the pilot portion of the pump compensator to shift spool 130 therein against centering spring 142 a slight amount in the direction dictated by the directional valve. This in turn will cause pump 12 to stroke slightly in the proper direction, it being at full r.p.m., to drive the vehicle in the aforementioned manner. Further depression of throttle lever 66 increases the force urging valve element 362 to the left in the throttle pump valve thereby increasing the pressure within fluid line 338 and consequently the displacement of pump 12. Full depression of throttle lever 66 will therefore cause pump 12 to be stroked to its maximum displacement position, and any intermediate position of the throttle lever will cause the pump to operate at a corresponding intermediate displacement position. The output of the pump and thus the speed and power exerted by each of the motors is thereby directly controlled by the throttle lever which in this mode of operation is controlling pump displacement. Deceleration will occur when the throttle lever is backed off, in the same manner as described above, and when the throttle lever is allowed to return to its fully retracted position the vehicle will freewheel just as in the other mode of operation.

It has been found that as a practical matter in many applications of a vehicle incorporating the drive in the present system, it is desirable to have the combined advantages of the fixed engine speed mode of operation and the variable speed mode of operation, without having to continually reset hand throttle valve 72. This combined mode of operation may be obtained by positioning the hand valve somewhere between its two maximum positions. For example, the spool 380 may be raised from its lowermost position to a point whereat the engine operates at a fixed minimum speed in the order of 25% to 50% of its maximum speed. When the hand valve is in this position the stroke of pump 12 will be under the control of the throttle lever according to the above-described fixed engine speed mode of operation, up to the speed at which the engine has been fixed. Subsequent depressing of the throttle lever will not further stroke the pump since the pressure within passageway 338 will have reached substantially its maximum value; however, the continued movement of member 274 will cause control rod 286 to increase the engine speed according to the variable engine speed mode of operation discussed above.

Accordingly, as will be appreciated, the present system is so arranged as to give the operator almost unlimited flexibility in the control of the vehicle, and this flexibility is obtained without unduly complicating the controls with which the operator must concern himself. If desired, the advantages of the anti-spin motor compensators disclosed in my copending application Serial No. 167,691, filed January 29, 1962, may be incorporated in the present circuit by simply substituting the motor compensators disclosed therein in lieu of the present motor compensators and by adding suitable sensing piston assemblies. In addition, if it is desired to provide a drive system which is capable of either two-wheel or four-wheel drive, such may be easily accomplished by simply providing a suitable selector valve for directing system fluid only to those motor-and-control assemblies which it is desired to have operative, communicating the deactivated units with tank so that they may freewheel.

Thus there is disclosed in the above description and in the drawings an exemplary embodiment of the present invention which fully and effectively accomplishes the objects thereof. However, it will be apparent that variations in the details of the construction may be indulged in without departing from the sphere of the invention herein described or the scope of the appended claims.

What is claimed is:

1. A hydrostatic drive system comprising: a variable displacement fluid pump; a prime mover for driving said pump; a plurality of fluid motors in fluid communication with said pump and adapted to be powered by the fluid therefrom; means independent of said pump for supplying control fluid at a control pressure; fluid actuatable means associated with said pump for controlling the displacement thereof; manually operable control means for communicating said control fluid to said fluid actuatable means to control the displacement and hence output of said pump, said control means also being adapted to vary the speed of said prime mover; and means including a relief valve for braking said motors by causing said pump to move to a zero displacement position and said motors to pump against said relief valve.

2. A hydrostatic drive system comprising: a variable displacement fluid pump; a prime mover for driving said pump; a plurality of fluid motors in fluid communication with said pump and adapted to be powered by the fluid therefrom; a variable relief valve for controlling the output pressure of said pump; means for supplying control fluid at a control pressure; fluid actuatable means associated with said pump for controlling the displacement thereof; manually operable control means for communicating said control fluid to said fluid actuatable means to control the displacement and hence output of said pump, said control means also being adapted to vary the speed of said prime mover; means for maintaining said relief valve at a maximum pressure setting when said pump is in an output position; and means for progressively braking said motors when said control means has been operated to cause said pump to move to a zero displacement position by progressively increasing the pressure setting of said relief valve from a minimum pressure setting, whereby said motors will pump against the progressively increasing load imposed by said relief valve.

3. A hydrostatic drive system comprising: a variable displacement fluid pump; a prime mover for driving said pump; a plurality of variable displacement fluid motors in fluid communication with said pump and adapted to be powered by the fluid therefrom; a variable relief valve for controlling the output pressure of said pump; means for supplying control fluid at a control pressure; fluid actuatable means associated with said pump for controlling the displacement thereof; manually operable control means for communicating said control fluid to said fluid actuatable means to control the displacement and hence output of said pump, said control means also being adapted to vary the speed of said prime mover; a motor compensator associated with each of said motors for controlling the displacement and hence torque output thereof in response to the pressure of the fluid supplied thereto by said pump; means for maintaining said relief valve at a maximum pressure setting when said pump is in an output position; and means for progressively braking said motors when said control means has been operated to cause said pump ot move to a zero displacement position by progressively increasing the pressure setting of said relief valve from a minimum pressure setting, whereby said motors will pump against the progressively increasing load imposed by said relief valve.

4. A hydrostatic drive system comprising: a variable displacement fluid pump having inlet and outlet ports; a reservoir; a prime mover for driving said pump; a pressure-responsive compensator associated with said pump for controlling the displacement thereof in response to the pressure of a control fluid supplied thereto; a plurality of fluid motors communicating with said inlet and outlet ports and adapted to be driven by the output of said pump; a manually operable throttle lever connected to said prime mover to control the speed thereof; means for supplying fluid under control pressure; a variable throttle valve communicating with said pump compensator, said reservoir and said source of fluid under control pressure for varying the pressure of the latter in response to the positioning of said throttle lever to control said pump compensator and hence the displacement of said pump, said throttle valve also being responsive to fluid under control pressure supplied thereto to override control of said throttle lever and maximize the pressure supplied to said pump compensator to maximize pump displacement; a control valve communicating with said source of control fluid for supplying fluid under control pressure, when actuated, to said variable throttle valve for cotnrolling said pump, said control valve being actuatable solely by said throttle lever; and manually operable selector means for actuating said control valve and controlling the speed of said prime mover, said selector means communicating with said control valve and being operable in a first position to communicate control fluid from said control valve to said throttle valve to override control thereof by said throttle lever and maximize the displacement of said pump whereby when said throttle lever is progressively actuated said control valve will be actuated to cause said pump to move to a maximum displacement position and the speed of said prime mover progressively increased to increase the output of said pump, and in a second position to prevent the supply of overriding control fluid to said throttle valve and to increase the speed of said prime mover to a fixed magnitude whereby progressive actuation of said throttle lever will cause the displacement position of said pump to progressively increase to increase the output thereof at fixed prime mover speed.

5. A hydrostatic drive system comprising a variable displacement fluid pump having inlet and outlet ports; a reservoir; a prime mover for driving said pump, a pressure-responsive compensator associated with said pump for controlling the displacement thereof in response to the pressure of a control fluid supplied thereto; a plurality of variable displacement fluid motors communicating with said inlet and outlet ports and adapted to be driven by the output of said pump; a pressure-responsive compensator associated with each of said motors responsive to the pressure of the fluid supplied thereto to vary the displacement and hence torque output thereof; a manually operable throttle lever connected to said prime mover to control the speed thereof; means for supplying fluid under control pressure; a variable throttle valve communicating with said pump compensator, said reservoir and said source of fluid under control pressure for varying the pressure of the latter in response to the positioning of said throttle lever to control said pump compensator and hence the displacement of said pump, said throttle valve also being responsive to fluid under control pressure supplied thereto to override control of said throttle lever and maximize the pressure supplied to said pump compensator to maximize pump displacement; a control valve communicating with said source of control fluid for supplying fluid under control pressure, when actuated, to said variable throttle valve for controlling said pump, said control valve being actuatable by said throttle lever; and manually operable selector means for actuating said control valve and controlling the speed of said prime mover, said selector means communicating with said control valve and being operable in a first position to communicate control fluid from said control valve to said throttle valve to override control thereof by said throttle lever and maximize the displacement of said pump whereby when said throttle lever is progressively actuated said control valve will be actuated to cause said pump to move to a maximum displacement position and the speed of said prime mover progressively increased to increase the output of said pump, and in a second position to prevent the supply of overriding control fluid to said throttle valve and to increase the speed of said prime mover to a fixed magnitude whereby progressive actuation of said throttle lever will cause the displacement position of said pump to progressively increase to increase the output thereof at fixed prime mover speed.

6. A hydrostatic drive system comprising a variable displacement fluid pump having inlet and outlet ports; a reservoir; a prime mover for driving said pump; a pressure-responsive compensator associated with said pump for controlling the displacement thereof in response to the pressure of a control fluid supplied thereto, a pilot-operated main system relief valve operatively connected between said inlet and outlet ports and said reservoir for controlling the maximum output pressure of said pump and the pressure of the system; a plurality of fluid motors communicating with said inlet and outlet ports and adapted to be driven by the output of said pump; manually operable brake and throttle levers, the latter being connected to said prime mover to control the speed thereof; means for supplying fluid under control pressure; a variable brake valve communicating with said main system relief valve and said reservoir and being operable through its range of pressure settings by said brake lever for controlling the pressure setting of said main system relief valve, said brake valve being responsive to fluid under control pressure supplied thereto to override control by said brake lever and maximize the pressure setting of said main system relief valve; a variable throttle valve communicating with said pump compensator, said reservoir and said source of fluid under control pressure for varying the pressure of the latter in response to the positioning of said throttle lever to control said pump compensator and hence the displacement of said pump, said throttle valve also being responsive to fluid under control pressure supplied thereto to override control of said throttle lever and maximize the pressure supplied to said pump compensator to maximize pump displacement; a control valve communicating with said source of control fluid for supplying fluid under control pressure, when actuated, to said variable brake valve to override the control of said brake lever and to said variable throttle valve for controlling said pump, said control valve being actuatable by said throttle lever; and manually operable selector means for actuating said control valve and controlling the speed of said prime mover, said selector means communicating with said control valve and being operable in a first position to communicate control fluid from said control valve to said throttle valve to override control thereof by said throttle lever and maximize the displacement of said pump whereby when said throttle lever is progressively actuated said control valve will be actuated to cause said pump to move to a maximum displacement position and the speed of said prime mover progressively increased to increase the output of said pump, and in a second position to prevent the supply of overriding control fluid to said throttle valve and to increase the speed of said prime mover to a fixed magnitude whereby progressive actuation of said throttle lever will cause the displacement position of said pump to progressively increase to increase the output thereof at fixed prime mover speed.

7. A hydrostatic drive system comprising: a variable displacement fluid pump having inlet and outlet ports; a reservoir; a prime mover for driving said pump; a pressure responsive compensator associated with said pump for controlling the displacement thereof in response to and proportional to the pressure of a control fluid supplied thereto; a pilot operated main system relief valve operatively connected between said inlet and outlet ports and said reservoir for controlling the maximum output pressure of said pump and the pressure of the system; a plurality of variable displacement fluid motors communicating with said inlet and outlet ports and adapted to be driven by the output of said pump; a pressure-responsive compensator associated with each of said motors responsive to the pressure of the fluid supplied thereto to vary the displacement and hence torque output thereof proportional to such pressure; manually operable brake and throttle levers, the latter being connected to said prime mover to control the speed thereof; means for supplying fluid under control pressure; a variable brake valve communicating with said main system relief valve and said reservoir and being operable through its range of pressure settings by said brake lever for controlling the pressure setting of said main system relief valve, said brake valve being responsive to fluid under control pressure supplied thereto to override control by said brake lever and maximize the pressure setting of said main system relief valve; a variable throttle valve communicating with said pump compensator, said reservoir and said source of fluid under control pressure for varying the pressure of the latter in response to the positioning of said throttle lever to control said pump compensator and hence the displacement of said pump, said throttle valve also being responsive to fluid under control pressure supplied thereto to override control of said throttle lever and maximize the pressure supplied to said pump compensator to maximize pump displacement; a control valve communicating with said source of control fluid for supplying fluid under control pressure, when actuated, to said variable brake valve to override the control of said brake lever and to said variable throttle valve for controlling said pump, said control valve being actuable solely by said throttle lever; and manually operable selector means for mechanically actuating said control valve and simultaneously controlling the speed of said prime mover, said selector means communicating with said control valve and being operable in a first position to communicate control fluid from said control valve to said throttle valve to override control thereof by said throttle lever and maximize the displacement of said pump whereby when said throttle lever is progressively actuated said control valve will be actuated to cause said pump to move to a maximum displacement position and the speed of said prime mover progressively increased to increase the output of said pump, and in a second position to prevent the supply of overriding control fluid to said throttle valve and to increase the speed of said prime mover to a fixed magnitude whereby progressive actuation of said throttle lever will cause the displacement position of said pump to progressively increase to increase the output thereof at fixed prime mover speed, actuation of said throttle lever in both said selector means positions causing said control valve to supply control fluid to said brake valve to override the control thereof by said brake lever to maximize the pressure setting of said main relief valve.

8. A system as claimed in claim 7, wherein said selector means is adapted to operate in a plurality of positions intermediate said first and second positions, whereby the system may be operated in a manner which is a combination of the modes of operation existing in said first and second positions, respectively.

9. A system as claimed in claim 7, wherein said control valve is so constructed that when it is actuated by said throttle lever control fluid is communicated to said brake valve slightly prior in time to when it is communicated to said throttle valve.

10. A hydrostatic drive system comprising: a variable displacement fluid pump; a prime mover for driving said pump; a fluid motor in fluid communication with said pump and adapted to be powered by the fluid therefrom; and manually operable control means for controlling the speed of said prime mover and for varying the displacement and hence output of said pump, said control means including manually operable multiposition selector means and a manually operable control lever, said control lever being progressively actuatable to increase the output of said system when said selector means is in a first position by progressively increasing the speed of said prime mover with said pump actuated to a maximum displacement position, and when said selector means is in a second position by progressively increasing the displacement position of said pump with said prime mover operating at a fixed speed.

11. A system as claimed in claim 10, wherein said control means is adapted to operate in a third position intermediate said first and second positions.

12. A hydrostatic drive system comprising: a variable displacement fluid pump; a prime mover for driving said pump; a variable displacement fluid motor in fluid communication with said pump and adapted to be powered by the fluid therefrom; manually operable control means for controlling the speed of said prime mover and for varying the displacement and hence output of said pump, said control means including manually operable multiposition selector means and a manually operable control lever, said control lever being progressively actuatable to increase the output of said system when said selector means in is a first position by progressively increasing the speed of said prime mover with said pump actuated to a maximum displacement position, and when said selector means is in a second position by progressively increasing the displacement position of said pump with said prime mover operating at a fixed speed; and a motor compensator associated with said motor for controlling the displacement and hence torque output thereof in response to the pressure of the fluid supplied thereto by said pump.

13. A system as claimed in claim 12, wherein said control means is adapted to operate in a third position intermediate said first and second positions.

14. A hydrostatic drive system comprising: a variable displacement fluid pump; a prime mover for driving said pump; a fluid motor in fluid communication with said pump and adapted to be powered by the fluid therefrom; manually operable control means for controlling the speed of said prime mover and for varying the displacement and hence output of said pump, said control means including manually operable multiposition selector means and a manually operable control lever, said control lever being progressively actuatable to increase the output of said system when said selector means is in a first position by progressively increasing the speed of said prime mover with said pump actuated to a maximum displacement position, and when said selector means is in a second position by progressively increasing the displacement position of said pump with said prime mover operating at a fixed speed; and means including a relief valve for braking said motor by causing said pump to move to a zero displacement position and said motor to pump against said relief valve.

15. A hydrostatic drive system comprising: a variable displacement fluid pump; a prime mover for driving said pump; a fluid motor in fluid communication with said pump and adapted to be powered by the fluid therefrom; variable relief valve means for controlling the output pressure of said pump; and control means operable to progressively brake said motor by progressively increasing the pressure setting of said relief valve when said pump is in a substantially zero displacement position, whereby said motor will pump against the progressively increasing load imposed by said relief valve.

16. A hydrostatic drive system comprising: a variable displacement fluid pump; a prime mover for driving said pump; a fluid motor in fluid communication with said pump and adapted to be powered by the fluid therefrom; pilot-operated variable relief valve means for controlling the output pressure of said pump; and control means including manually actuatable brake valve means in fluid communication with said pilot-operated relief valve means for controlling the latter, said control means being operable to progressively brake said motor by progressively increasing the pressure setting of said relief valve when said pump is in a substantially zero displacement position, whereby said motor will pump aginst the progressively increasing load imposed by said relief valve.

17. A hydrostatic drive system comprising: a variable displacement fluid pump; a prime mover for driving said pump; a fluid motor in fluid communication with said pump and adapted to be powered by the fluid therefrom; variable relief valve means for controlling the output pressure of said pump; means for maintaining said relief valve means at a maximum pressure setting when said pump is pumping; and control means operable to render ineffective last-mentioned means and to progressively brake said motor by progressively increasing the pressure setting of said relief valve when said pump is in a substantially zero displacement position whereby said motor will pump against the progressively increasing load imposed by said relief valve.

18. A hydrostatic drive system comprising: a variable displacement fluid pump; a prime mover for driving said pump; a fluid motor in fluid communication with said pump and adapted to be powered by the fluid therefrom; pilot-operated variable relief valve means for controlling the output pressure of said pump; pilot valve means for controlling said variable relief valve; a manually operable brake lever for actuating said pilot valve means; and control means including means for overriding control by said brake lever and causing said pilot valve to maintain said relief valve means at a maximum pressure setting when said pump is pumping, and means for rendering said last-mentioned means ineffective when said pump is not pumping, said pilot valve being progressively actuatable by said brake lever when said pump is not pumping to progressively brake said motor by progressively increasing the pressure setting of said relief valve, whereby said motor will pump against the progressively increasing load imposed by said relief valve.

19. A hydrostatic drive system comprising: a variable displacement fluid pump; a prime mover for driving said pump; a fluid motor in fluid communication with said pump and adapted to be powered by the fluid therefrom; pilot-operated variable relief valve means for controlling the output pressure of said pump; pilot valve means for controlling said variable relief valve; a manually operable brake lever for actuating said pilot valve means; and control means including means for causing said pump to operate in a positive output condition, means for overriding control by said brake lever and causing said pilot valve to maintain said relief valve means at a maximum pressure setting when said pump is in a positive output condition, and means for rendering said last-mentioned means ineffective and causing said pump to assume a zero output condition, said pilot valve being progressively actuatable by said brake lever when said pump is in said latter condition to progressively brake said motor by progressively increasing the pressure setting of said relief valve, whereby said motor will pump against the progressively increasing load imposed by said relief valve.

20. A hydrostatic drive system comprising: a variable displacement fluid pump; a prime mover for driving said pump; a fluid motor in fluid communication with said pump and adapted to be powered by the fluid therefrom; pilot-operated variable relief valve means for controlling the output pressure of said pump; pilot valve means for controlling said variable relief valve; a manually operable brake lever for actuating said pilot valve means; and control means including manually actuatable throttle means for causing said pump to operate in a positive output condition, and means responsive to actuation of said throttle means for overriding control by said brake lever and causing said pilot valve to maintain said relief valve means at a maximum pressure setting, said last-mentioned means being operable to become ineffective when said throttle means is deactuated and said pump assumes a zero output condition, said pilot valve being progressively actuatable by said brake lever when said pump is in said latter condition to progressively brake said motor by progressively increasing the pressure setting of said relief valve, whereby said motor will pump against the progressively increasing load imposed by said relief valve.

21. A hydrostatic drive system comprising: a variable displacement fluid pump; a prime mover for driving said pump; a fluid motor in fluid communcation with said pump and adapted to be powered by the fluid therefrom; variable relief valve means for controlling the output pressure of said pump; and manually operable control means for controlling the speed of said prime mover and for varying the displacement and hence output of said pump, said control means including manually operable multiposition selector means and a manually operable control lever, said control lever being progressively actuatable to increase the output of said system when said selector means is in a first position by progressively increasing the speed of said prime mover with said pump actuated to a maximum displacement position, and when said selector means is in a second position by progressively increasing the displacement position of said pump with said prime mover operating at a fixed speed, said control means also being operable to progressively brake said motor by causing said pump to move to a zero displacement position and by progressively increasing the pressure setting of said relief valve, whereby said motor will pump against the progressively increasing load imposed by said relief valve.

22. A hydrostatic drive system comprising: a variable displacement fluid pump; a prime mover for driving said pump; a fluid motor in fluid communication with said pump and adapted to be powered by the fluid therefrom; variable relief valve means for controlling the output pressure of said pump; throttle means for controlling the speed of said prime mover and for varying the output displacement of said pump; and braking means including a manually actuatable brake lever for progressively hydraulically braking said motor, said relief valve means being responsive to said throttle means to assume a maximum pressure setting when said pump is in a positive output position, and responsive to said braking means to assume a pressure setting proportional to the position of said brake lever when said pump is in a zero displacement position to thereby provide a braking load against which said motor must pump.

23. A hydrostatic drive system comprising: a variable displacement fluid pump; a prime mover for driving said pump; a fluid motor in fluid communication with said pump and adapted to be powered by the fluid therefrom; throttle means including a manually actuatable throttle lever, for varying the output displacement of said pump; and multiposition selector means for controlling the mode of operation of said throttle means, said throttle means being operable when said selector means is in a first position to cause said pump to assume a maximum output displacement condition and to vary the supply of power to said motor by varying the speed of said prime mover, and said throttle means and selector means being operable when the latter is in a second position to cause said prime mover to assume a substantially fixed operating speed and to vary the supply of power to said motor by varying the output displacement of said pump.

24. A system as claimed in claim 23, wherein said selector means is operable in a third position intermediate said first and second positions.

25. A hydrostatic drive system comprising: a variable displacement fluid pump; a prime mover for driving said pump; a fluid motor in fluid communication with said pump and adapted to be powered by the fluid therefrom; manually operable control means for controlling the speed of said prime mover and for varying the displacement and hence output of said pump, said control means including manually operable multiposition selector means and a manually operable control lever, said control lever being progressively actuatable to increase the output of said system when said selector means is in a first position by progressively increasing the speed of said prime mover with said pump actuated to a maximum displacement position, and when said selector means is in a second position by progressively increasing the displacement position of said pump with said prime mover operating at a fixed speed; and means responsive to the output pressure of said pump for decreasing the displacement position thereof when said output pressure reaches a predetermined amount.

26. A hydrostatic drive system comprising: a variable displacement fluid pump; a prime mover for driving said pump; a variable displacement fluid motor in fluid communication with said pump and adapted to be powered by the fluid therefrom; manually operable control means for controlling the speed of said prime mover and for varying the displacement and hence output of said pump, said control means including manually operable multiposition selector means and a manually operable control lever, said control lever being progressively actuatable to increase the output of said system when said selector means is in a first position by progressively increasing the speed of said prime mover with said pump actuated to a maximum displacement position, and when said selector means is in a second position by progressively increasing the displacement position of said pump with said prime mover operating at a fixed speed; a motor compensator associated with said motor for controlling the displacement and hence torque output thereof in response to the pressure of the fluid supplied thereto by said pump; and means responsive to the output pressure of said pump for decreasing the displacement position thereof when said output pressure reaches a predetermined amount.

27. A hydrostatic drive system comprising: a variable displacement fluid pump; a prime mover for driving said pump; a fluid motor in fluid communication with said pump and adapted to be powered by the fluid therefrom; pilot-operated variable relief valve means for controlling the output pressure of said pump; pilot valve means for controlling said variable relief valve; a manually operable brake lever for actuating said pilot valve means; control means including manually actuatable throttle means for causing said pump to operate in a positive output condition, and means responsive to actuation of said throttle means for overriding control by said brake lever and causing said pilot valve to maintain said relief valve means at a maximum pressure setting, said last-mentioned means being operable to become ineffective when said throttle means is deactuated and said pump assumes a zero output condition, said pilot valve being progressively actuatable by said brake lever when said pump is in said latter condition to progressively brake said motor by progressively increasing the pressure setting of said relief valve, whereby said motor will pump against the progressively increasing load imposed by said relief valve; and means responsive to the output pressure of said pump when the latter is in a positive output condition for decreasing the displacement position thereof when said output pressure reaches a predetermined amount.

28. A hydrostatic drive system comprising: a variable displacement fluid pump; a prime mover for driving said pump; a fluid motor in fluid communication with said pump and adapted to be powered by the fluid therefrom; variable relief valve means for controlling the output pressure of said pump; throttle means including a manually actuatable throttle lever, for varying the output displacement of said pump; multiposition selector means for controlling the mode of operation of said throttle means, said throttle means being operable when said selector means is in a first position to cause said pump to assume a maximum output displacement condition and to vary the supply of power to said motor by varying the speed of said prime mover, and said throttle means and selector means being operable when the latter is in a second position to cause said prime mover to assume a substantially fixed operating speed and to vary the supply of power to said motor by varying the output displacement of said pump; and brake means for progressively increasing the pressure setting of said relief valve when said pump is in a substantially zero displacement position whereby said motor will pump against the progressively increasing load imposed by said relief valve.

References Cited by the Examiner

UNITED STATES PATENTS

| | | | |
|---|---|---|---|
| 2,774,436 | 12/56 | Ferris | 60—19 X |
| 2,941,365 | 6/60 | Carlson et al. | 60—53 X |
| 3,003,309 | 10/61 | Bowers et al. | 60—19 |

JULIUS E. WEST, *Primary Examiner.*

EDGAR W. GEOGHEGAN, *Examiner.*